US008521221B2

(12) United States Patent
Lu et al.

(10) Patent No.: US 8,521,221 B2
(45) Date of Patent: Aug. 27, 2013

(54) DUAL MODE RF TRANSCEIVER AND RECEIVING METHOD OF THE SAME

(75) Inventors: Shey-Shi Lu, Taipei (TW); Hsien-Ku Chen, Taipei County (TW)

(73) Assignee: National Taiwan University, Taipei (TW)

( * ) Notice: Subject to any disclaimer, the term of this patent is extended or adjusted under 35 U.S.C. 154(b) by 287 days.

(21) Appl. No.: 12/960,453

(22) Filed: Dec. 3, 2010

(65) Prior Publication Data
US 2012/0094620 A1 Apr. 19, 2012

(30) Foreign Application Priority Data

Oct. 13, 2010 (TW) .............................. 99134931 A (51) Int. Cl.
*H04M 1/00* (2006.01)
(52) U.S. Cl.
USPC ..... 455/552.1; 455/293; 455/323; 455/553.1; 330/252; 330/295; 375/318
(58) Field of Classification Search
None
See application file for complete search history.

(56) References Cited

U.S. PATENT DOCUMENTS

| 7,224,225 | B2* | 5/2007 | Chang | 330/253 |
|---|---|---|---|---|
| 7,356,318 | B2* | 4/2008 | Sowlati | 455/168.1 |
| 7,577,418 | B2* | 8/2009 | Chang et al. | 455/323 |
| 7,688,146 | B2* | 3/2010 | Kao et al. | 330/301 |
| 7,982,527 | B2* | 7/2011 | Dawe et al. | 327/355 |
| 8,260,223 | B2* | 9/2012 | He | 455/120 |
| 2004/0246051 | A1* | 12/2004 | Hsu et al. | 330/252 |
| 2006/0066431 | A1* | 3/2006 | Anand et al. | 336/137 |
| 2007/0242779 | A1* | 10/2007 | Choi et al. | 375/332 |
| 2008/0136528 | A1* | 6/2008 | Sjoland | 330/301 |
| 2008/0188196 | A1* | 8/2008 | Chen et al. | 455/293 |
| 2010/0119022 | A1* | 5/2010 | He et al. | 375/350 |
| 2011/0237211 | A1* | 9/2011 | Alam et al. | 455/130 |

OTHER PUBLICATIONS

H.Y. David Yang, Design Considerations of Differential Inductors in CMOS Technology for RFIC, 2004, IEEE Radio Frequency Integrated Circuits Symposium, p. 449-452.*

* cited by examiner

*Primary Examiner* — Nay A Maung
*Assistant Examiner* — Alejandro Rivero
(74) *Attorney, Agent, or Firm* — CKC & Partners Co., Ltd.

(57) ABSTRACT

A dual mode RF transceiver is provided. The dual mode RF transceiver comprises an antenna, a differential low noise amplifier (LNA), a local oscillator and a dual mode differential mixer. The differential LNA receives an RF signal from the antenna to generate a differential amplified RF signal. The dual mode differential mixer comprises a switch module, a plurality of fundamental mixers and a plurality of sub-harmonic mixers. The fundamental mixers are activated in a first receiving mode to generate a first differential baseband signal according to a multiphase local oscillating (LO) signal from the local oscillator and the differential amplified RF signal. The sub-harmonic mixers are activated in a second receiving mode to generate a second differential baseband signal according to the multiphase LO signal from the local oscillator and the differential amplified RF signal. An RF signal receiving method is disclosed herein as well.

19 Claims, 6 Drawing Sheets

DUAL MODE RF TRANSCEIVER AND RECEIVING METHOD OF THE SAME

RELATED APPLICATIONS

This application claims priority to Taiwan Application Serial Number 099134931, filed Oct. 13, 2010, which is herein incorporated by reference.

BACKGROUND

1. Technical Field

The present disclosure relates to a communication device and method. More particularly, the present disclosure relates to a dual mode RF transceiver and a receiving method of the same.

2. Description of Related Art

A zero intermediate frequency (IF) transceiver is a circuit designed for converting a received RF signal to base band frequencies directly. The zero IF transceiver is easy to be implemented in the integration of RF-SoC design because it requires no image rejection filter nor IF filter. However, I/Q mismatch is a serious issue of a dual mode RF transceiver. I/Q mismatch may cause the DC offset problems. On the other hand, the performance of the zero IF transceiver can be degraded because of the local oscillator pulling problem or the increase of the power when the local oscillating signal is in a high frequency circumstance.

Accordingly, what is needed is a dual mode RF transceiver and a receiving method of the same to overcome the above issues. The present disclosure addresses such a need.

SUMMARY

An aspect of the present disclosure is to provide a dual mode RF transceiver. The dual mode RF transceiver comprises an antenna, a differential low noise amplifier (LNA), a local oscillator and a dual mode differential mixer. The differential LNA comprises a differential amplifier and a differential inductor circuit. The differential amplifier comprises an input to receive a RF signal from the antenna, wherein a frequency of the RF signal is within a first frequency band range in a first receiving mode, and is within a second frequency band range in a second receiving mode, where the frequency in the second frequency band range is about twice the frequency in the first frequency band range. The differential inductor circuit is coupled to a differential output of the differential amplifier and generates a differential amplified RF signal according to a first inductance in the first receiving mode and according to a second inductance in the second receiving mode. The local oscillator generates a multiphase local oscillating (LO) signal having an oscillating frequency within the first frequency band range. The dual mode differential mixer comprises a switch module, a plurality of fundamental mixers and a plurality of sub-harmonic mixers. The plurality of fundamental mixers are activated in the first receiving mode to generate a first differential baseband signal according to the multiphase LO signal from the local oscillator and the differential amplified RF signal. The plurality of sub-harmonic mixers are activated in the second receiving mode to generate a second differential baseband signal according to the multiphase LO signal from the local oscillator and the differential amplified RF signal.

Another aspect of the present disclosure is to provide a RF signal receiving method adapted in a dual mode RF transceiver. The RF signal receiving method comprises the steps as follows. An RF signal is received from an antenna, wherein the RF signal is within a first frequency band range in a first receiving mode, and is within a second frequency band range in a second receiving mode, where the frequency in the second frequency band range is about twice of the frequency in the first frequency band range. A differential amplified RF signal is generated according to a differential inductor circuit coupled to a differential amplifier, wherein the differential inductor circuit has a first inductance in the first receiving mode and has a second inductance in the second receiving mode. A multiphase LO signal having an oscillating frequency within the first frequency band range is generated. A plurality of fundamental mixers are activated in the first receiving mode to respectively generate a first differential baseband signal according to the multiphase LO signal from the local oscillator having two opposite phases and the differential amplified RF signal, and a plurality of sub-harmonic mixers are activated in the second receiving mode to respectively generate a second differential baseband signal according to the multiphase LO signal from the local oscillator having four orthogonal phases and the differential amplified RF signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
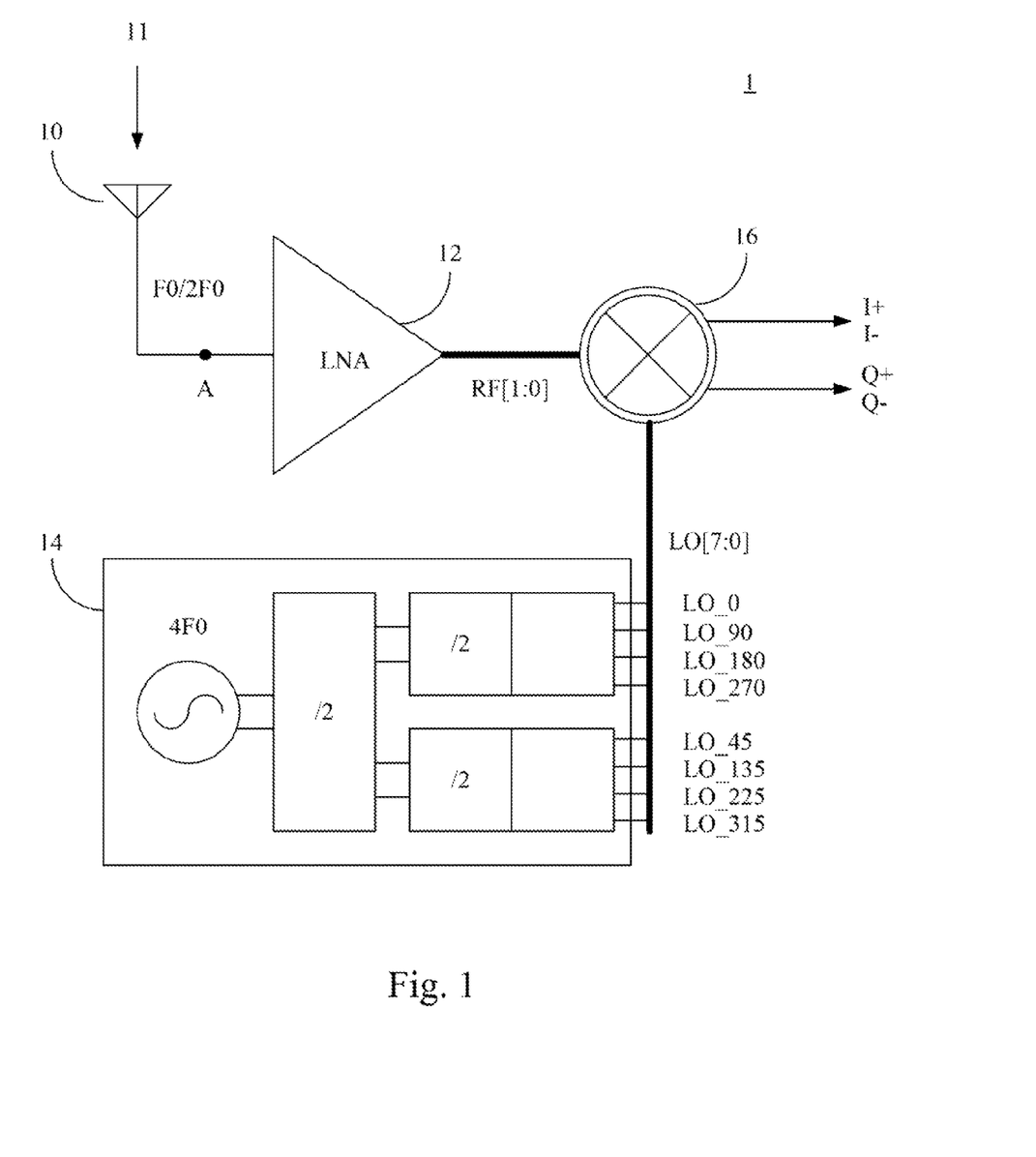
FIG. 1 is a block diagram of a dual mode RF transceiver.

Please refer to FIG. 1. FIG. 1 is a block diagram of a dual mode RF transceiver 1. The dual mode RF transceiver 1 comprises an antenna 10, a differential low noise amplifier (LNA) 12, a local oscillator 14 and a dual mode differential mixer 16.

The antenna 10 is able to operate in a first receiving mode and a second receiving mode. For example, in the first receiving mode, the antenna 10 receives an RF signal 11 having a frequency of about 2 GHz (F0) within a first frequency band range. And in the second receiving mode, the antenna 10 receives an RF signal 11 having a frequency of about 5 GHz (2F0) within a second frequency band range. In the present embodiment, the frequency in the second frequency band range is about twice of the frequency in the first frequency band range.

Figure 2:
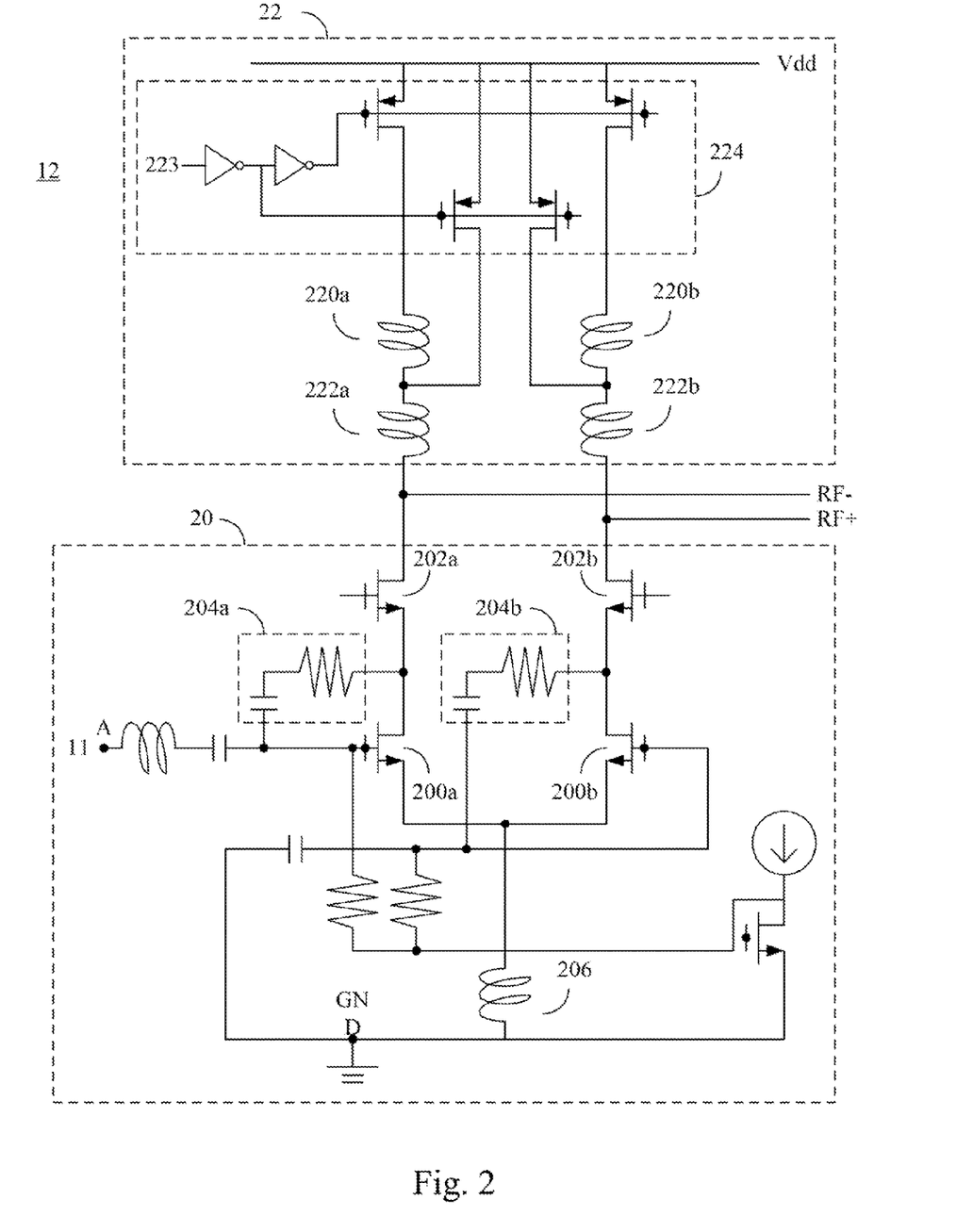
FIG. 2 is a further detailed circuit diagram of the differential LNA depicted in FIG. 1.

Please refer to FIG. 2. FIG. 2 is a further detailed circuit diagram of the differential LNA 12 depicted in FIG. 1. The differential LNA 12 comprises a differential amplifier 20 and a differential inductor circuit 22.

The differential amplifier 20 comprises a first amplifying branch and a second amplifying branch. The first amplifying branch comprises an input MOS 200a, an output MOS 202a and an input matching module 204a. The second amplifying branch comprises an input MOS 200b, an output MOS 202b and an input matching module 204b.

In the present embodiment, the input MOS 200a, 200b and the output MOS 202a, 202b are NMOS. The gate of the input MOS 200a is an input connected to the antenna 10 at the point A to receive the RF signal 11 from the antenna 10. The source of the output MOS 202a is coupled to the drain of the input MOS 200a. The gate of the MOS 200b is a coupling input coupled to a coupled voltage. In the present embodiment, the coupled voltage is a ground potential GND. A load, such as a resistor or a capacitor, is disposed between the gate of the MOS 200b and the coupled voltage. In an embodiment, the resistance of the load is better to be kept small. In an embodiment, the resistance of the load is kept to be near zero.

The source of the output MOS 202b is coupled to the drain of the input MOS 200b. The drain of the output MOS 202a and 202b are connected to a first output and a second output to generate a differential amplified RF signal having a pair of signals RF− and RF+ respectively.

The first amplifying branch and the second amplifying branch further comprise input matching modules 204a and 204b respectively. Each of the matching modules 204a and 204b comprises a capacitor and a resistor in the present embodiment to provide an input matching mechanism.

The source of the input MOS 200a and 200b further connected to the ground Potential GND through an inductor 206. The inductance of the inductor 206 is larger than a specific value. In an embodiment, the inductance of the inductor 206 is larger than 500 Ohm to make the performance of the mechanism of turning a single signal to a pair of differential signals better.

The differential inductor circuit 22 substantially comprises two sets of inductors. One set of the inductors has inductors 220a and 222a, where the other set of the inductors has inductors 220b and 222b. The inductors 220a, 222a, 220b and 222b are a center-tapped symmetrical inductor circuit. The inductors 222a and 222b are coupled to the first and the second output of the differential amplifier 20. The differential inductor circuit 22 further comprises a control circuit 224 to receive a control signal 223. In an embodiment, the control signal is 0 in the first receiving mode such that the inductors 220a, 222a, 220b and 222b are all in operation to provide a first inductance having a larger value to deal with the RF signal 11 (F0) having a lower frequency, where the control signal is 1 in the second receiving mode such that only the inductors 222a and 222b are in operation to provide a second inductance having a smaller value to deal with the RF signal 11 (2F0) having a higher frequency.

Consequently, the RF signal 11 turns from a single signal to a different pair of signals at the first and the second output (the differential amplified RF signal RF− and RF+) after the processing of the differential amplifier 20 and the differential inductor circuit 22. In order to specify that there are substantially two signals, the differential amplified RF signal is depicted as RF[1:0] in FIG. 1.

It's noticed that in the previous description the input MOS 200a, 200b and the output MOS 202a, 202b are NMOS. However, under a proper design, the PMOS can also be adapted to implement the differential amplifier 20.

The local oscillator 14 generates a multiphase local oscillating (LO) signal. In the present embodiment, the multiphase LO signal is generated by two division processes according to an oscillator source having a source frequency (4F0) that is four times of the oscillating frequency of the multiphase LO signal. The multiphase LO signal is substantially an eight-phase LO signal comprising the phases of 0 degree, 45 degrees, 90 degrees, 135 degrees, 180 degrees, 225 degrees, 270 degrees, and 315 degrees and the eight-phase LO signal is depicted as LO[7:0] comprising eight parts LO_0°, LO_45°, LO_90° LO_135°, LO_180°, LO_225°, LO_270° and LO_315° in FIG. 1. Therefore, after the two division processes of the source frequency (4F0), the LO signal having the oscillating frequency F0 within the first frequency band range is generated.

Figure 3:
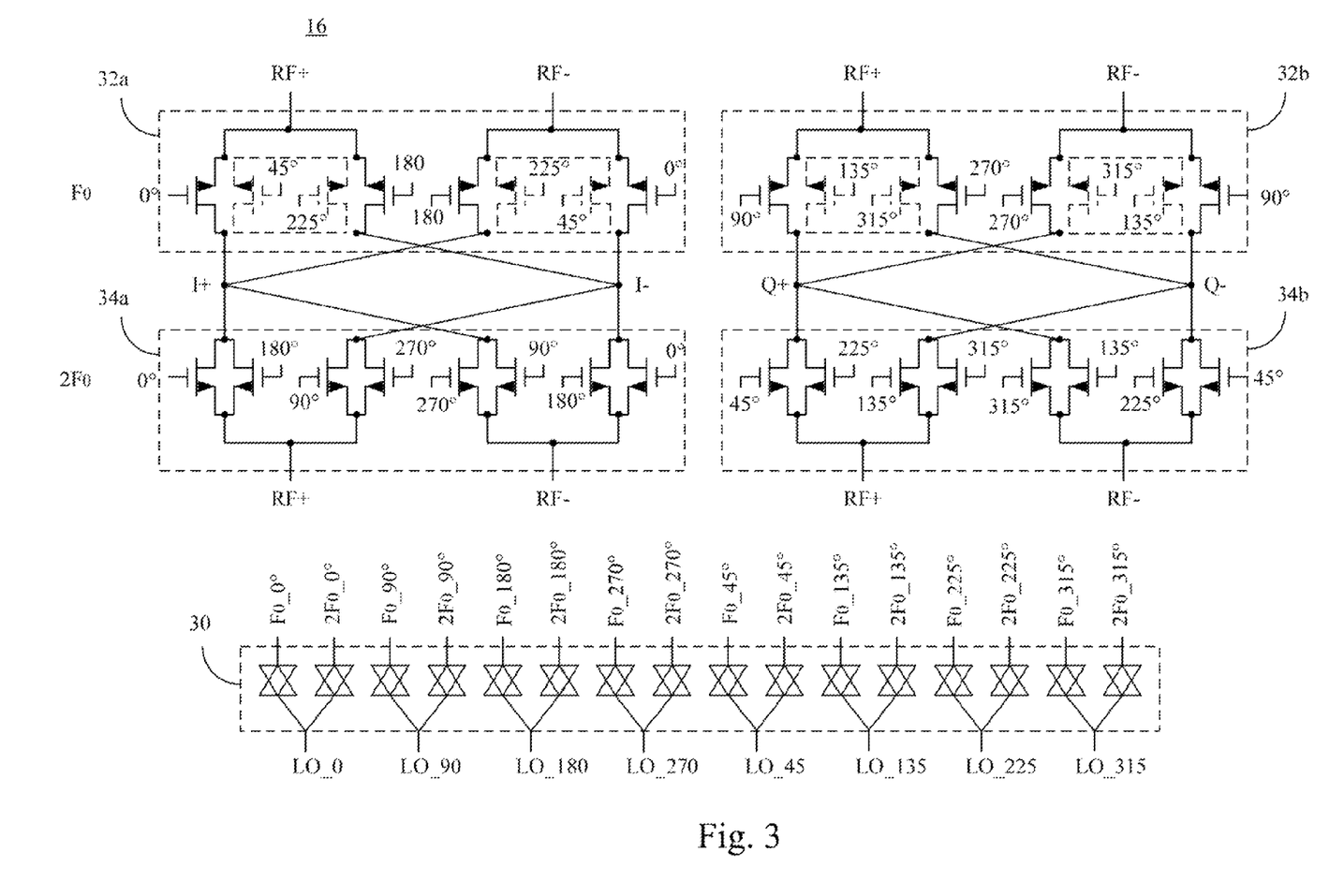
FIG. 3 is a diagram of the dual mode differential mixer in an embodiment of the present disclosure.

Please refer to FIG. 3. FIG. 3 is a diagram of the dual mode differential mixer 16 in an embodiment of the present disclosure. The dual mode differential mixer 16 comprises a switch module 30, two fundamental mixers 32a, 32b and two sub-harmonic mixers 34a, 34b.

The switch module 30 can be implemented by transmission gates or other elements. The switch module 30 receives the eight parts of the LO signal LO_0°, LO_45°, LO_90° LO_135°, LO_180°, LO_225°, LO_270°, LO_315° and sends the LO signal to the fundamental mixers 32a, 32b in the first receiving mode. Thus, the eight parts of the LO signal having the frequency F0 are depicted as F0_0°, F0_45°, F0_90°, F0_135°, F0_180°, F0_225°, F0_270° and F0_315°.

Figure 4:
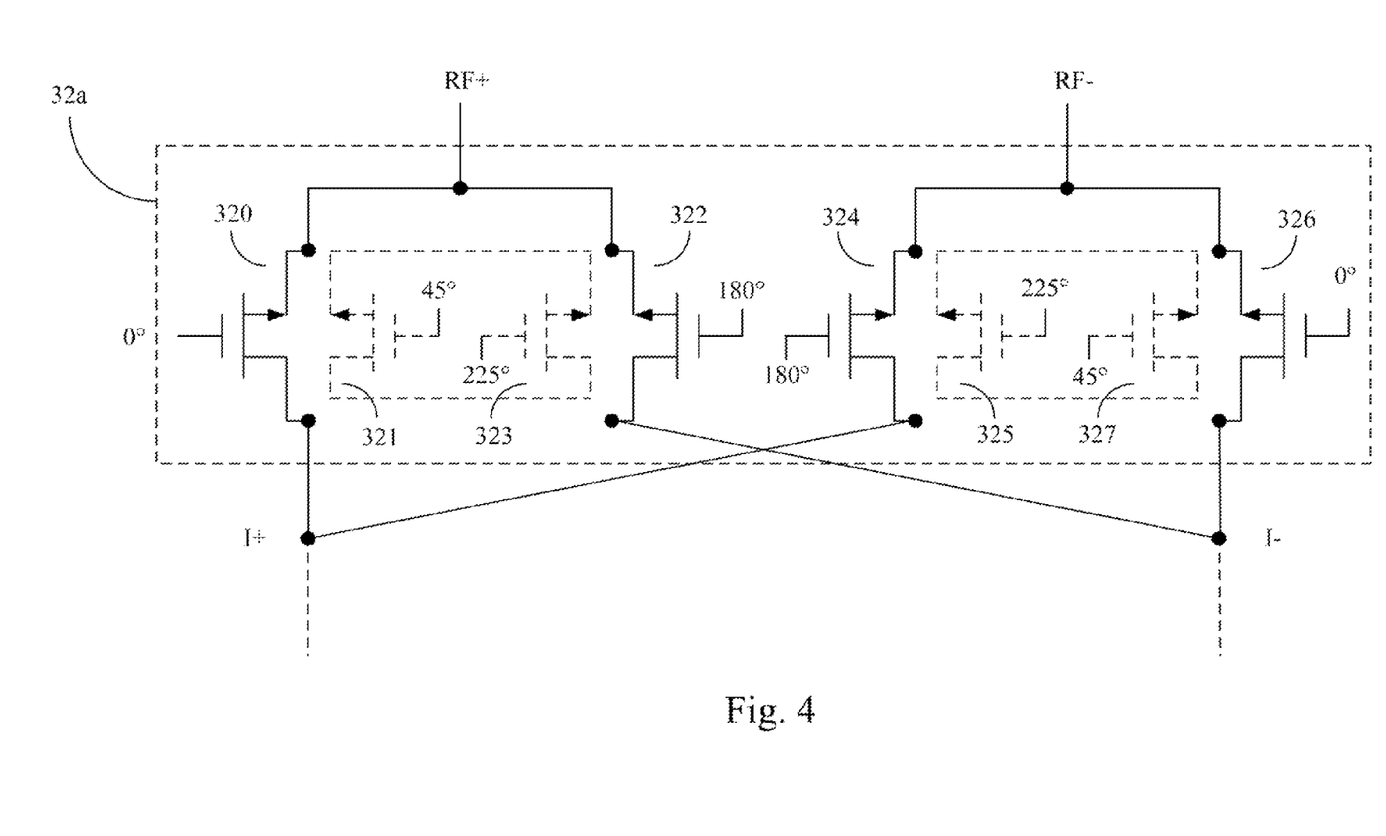
FIG. 4 is a diagram of the fundamental mixer.

The fundamental mixers 32a and 32b is a Gilbert mixer respectively in the present embodiment. Please refer to FIG. 4 at the same time. FIG. 4 is a diagram of the fundamental mixer 32a. The Gilbert mixer comprises four mixing units. In the present embodiment, each of the mixing units comprises a NMOS. The gates of the four NMOS 320, 322, 324 and 326 in the fundamental mixer 32a are activated when receiving the multiphase LO signal from the local oscillator 14 having two opposite phases F0_0° and F0_180° in the first receiving mode and perform frequency-mixing process according to the differential amplified RF signal having RF+ and RF− parts fed to the source of the four NMOS 320, 322, 324 and 326 to generate a first differential baseband signal at the drain. In the present embodiment, the first differential baseband signal generated by the fundamental mixer 32a is an in-phase differential baseband signal comprising a pair of signals I+ and I−.

It's noticed that the fundamental mixer 32a in the present embodiment further comprises dummy mixers 321, 323, 325 and 327. The dummy mixers 321, 323, 325 and 327 cancel out the part of the multiphase LO signal not used by the Gilbert mixer, i.e. F0_45°, F0_135°, F0_225° and F0_315° in the present embodiment. As shown in FIG. 4, the part generated by mixing the RF+ part of the differential amplified RF signal and the F0_45° is cancelled by the part generated by mixing the RF+ part of the differential amplified RF signal and the F0_225°. The part generated by mixing the RF− part of the differential amplified RF signal and the F0_45° is cancelled by the part generated by mixing the RF− part of the differential amplified RF signal and the F0_225°. Thus, the unused parts are cancelled to avoid interference on the generation of the differential baseband signal.

Similarly, the gates of the four NMOS in the fundamental mixer 32b are activated when receiving the multiphase LO signal from the local oscillator 14 having two opposite phases F0_90° and F0_270° in the first receiving mode and perform frequency-mixing process according to the differential amplified RF signal having RF+ and RF− parts fed to the source of the four NMOS to generate the first differential baseband signal at the drain. In the present embodiment, the first differential baseband signal generated by the fundamental mixer 32b is a quadrature-phase differential baseband signal comprising a pair of signals Q+ and Q−. The unused parts of the LO signal F0_225° and F0_315° are cancelled by the dummy mixers as well.

The switch module 30 receives the eight parts of the LO signal LO_0°, LO_45°, LO_90° LO_135°, LO_180°, LO_225°, LO_270°, LO_315° and sends the LO signal to the sub-harmonic mixers 34a, 34b in the first receiving mode. Thus, the eight parts of the LO signal having the frequency F0 are depicted as 2F0_0°, 2F0_45°, 2F0_90°, 2F0_135°, 2F0_180°, 2F0_225°, 2F0_270° and 2F0_315°.

Figure 5:
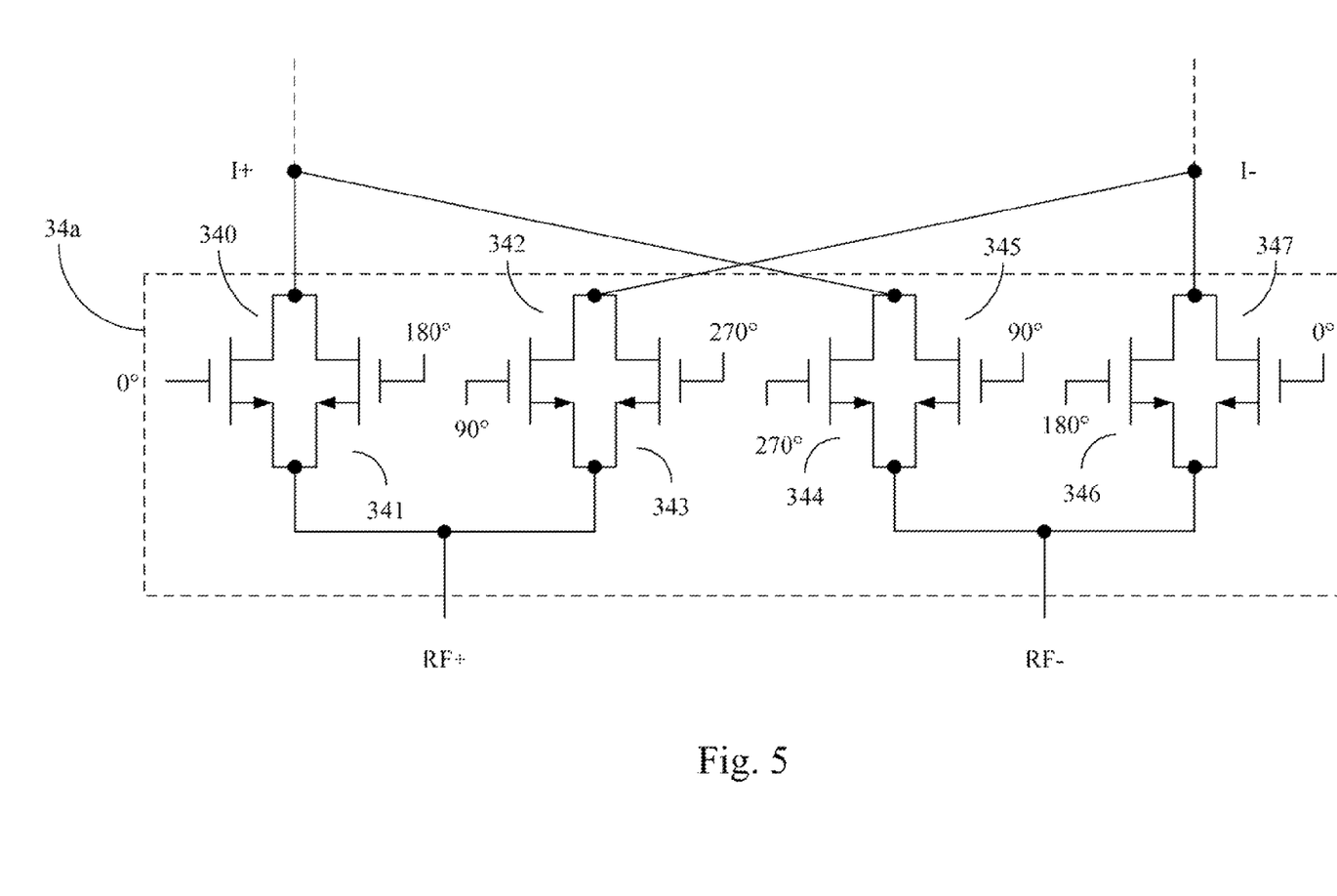
FIG. 5 is a diagram of the sub-harmonic mixer.

The sub-harmonic mixers 34a and 34b is a Gilbert mixer respectively in the present embodiment. Please refer to FIG. 5 at the same time. FIG. 5 is a diagram of the sub-harmonic mixer 34a. The Gilbert mixer comprises four mixing units. In the present embodiment, each of the mixing units comprises two NMOS connected in parallel. The gates of the four pairs of NMOS 340/341, 342/343, 344/345 and 346/347 in the sub-harmonic mixer 34a are activated when receiving the multiphase LO signal from the local oscillator 14 having four to orthogonal phases 2F0_0°, 2F0_90°, F0_180° and 2F0_270° in the second receiving mode and perform frequency-mixing process according to the differential amplified RF signal having RF+ and RF− parts fed to the source of the four pairs of NMOS to generate a second differential baseband signal at the drain. In the present embodiment, the second differential baseband signal generated by the sub-harmonic mixer 34a is an in-phase differential baseband signal comprising a pair of signals I+ and I−.

Similarly, the gates of the four pairs of NMOS in the sub-harmonic mixer 34b are activated when receiving the multiphase LO signal from the local oscillator 14 having four orthogonal phases 2F0_45°, 2F0_135°, F0_225° and 2F0_315° in the second receiving mode and perform frequency-mixing process according to the differential amplified RF signal having RF+ and RF− parts fed to the source of the four pairs of NMOS to generate the second differential baseband signal at the drain. In the present embodiment, the second differential baseband signal generated by the sub-harmonic mixer 34b is a quadrature-phase differential baseband signal comprising a pair of signals Q+ and Q−.

Accordingly, only one multiphase LO signal is used in the present embodiment to accomplish the dual mode receiving of the RF signal. No additional LO signal conversion circuit is needed to be adapted to different receiving modes. Thus, the power and area of the transceiver can be saved. The oscillator source having a frequency much higher than the frequency of the RF signal can avoid the interference as well. Furthermore, the multiphase LO signal generated from the division of the oscillator source can have lower loss during the transmission due to the lower frequency. Consequently, the impact of the I/Q mismatch can be lowered.

The differential LNA operative in the dual modes further save the area of the RF transceiver. The fundamental mixers and the sub-harmonic mixers are able to convert the frequency of the RF signal to the baseband directly in different modes according to the same LO signal. It's noticed that though the fundamental mixers and the sub-harmonic mixers described above are formed by NMOS, they can be implemented by PMOS as well.

Figure 6:
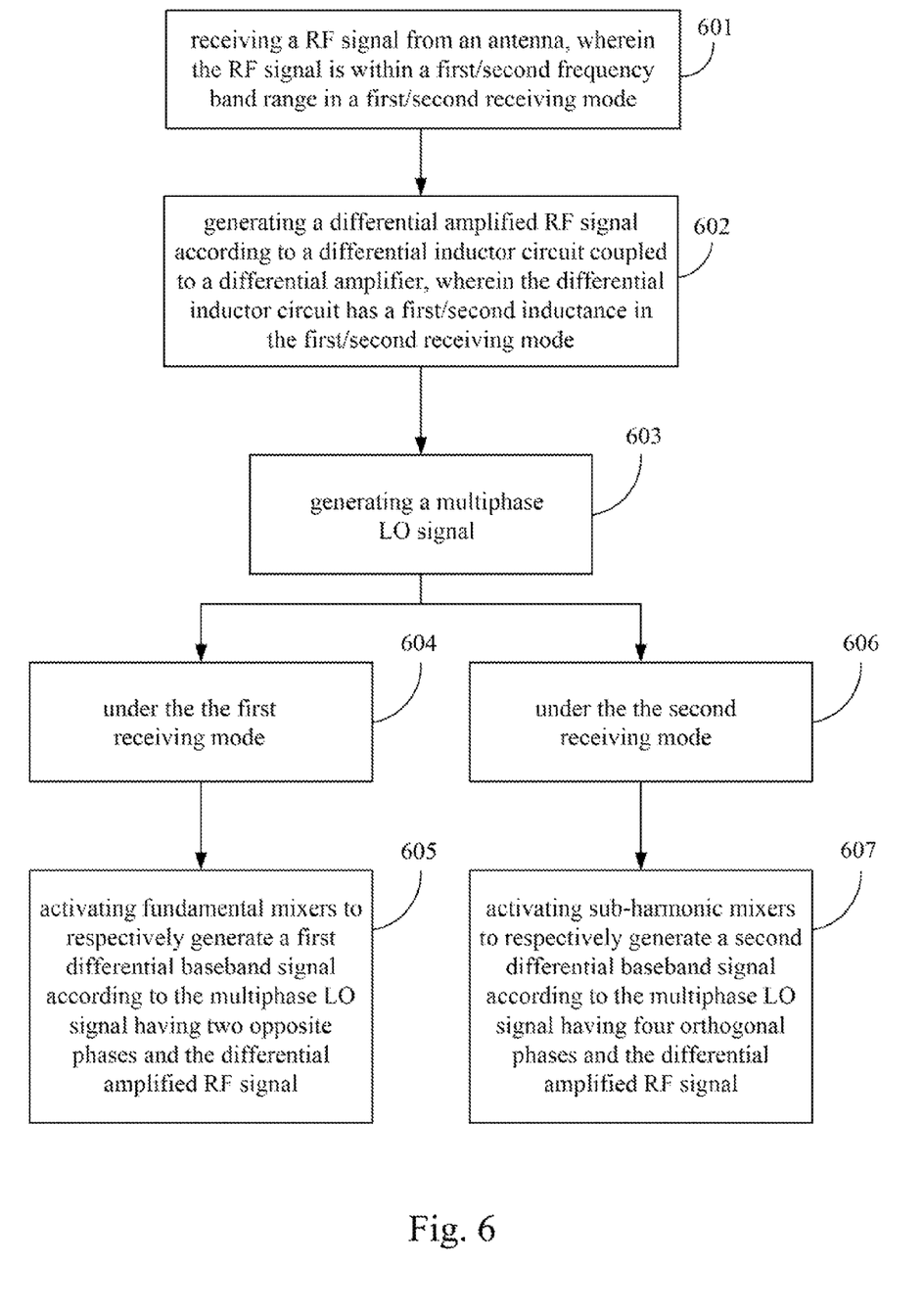
FIG. 6 is a flow chart of a RF signal receiving method in an embodiment of the present disclosure.

Please refer to FIG. 6. FIG. 6 is a flow chart of an RF signal receiving method in an embodiment of the present disclosure. The RF signal receiving method can be adapted in the dual mode RF transceiver 1 as depicted in FIG. 1. The RF signal receiving method comprises the steps as follows. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 601, an RF signal 11 is received from an antenna 10, wherein the RF signal 11 is within a first frequency band range in a first receiving mode, and is within a second frequency band range in a second receiving mode, where the frequency in the second frequency band range is about twice of the frequency in the first frequency band range. In step 602, a differential amplified RF signal (RF+/RF−) is generated according to a differential inductor circuit coupled to a differential amplifier, wherein the differential inductor circuit has a first inductance in the first receiving mode and has a second inductance in the second receiving mode. In step 603, a multiphase LO signal LO[7:0] having an oscillating frequency within the first frequency band range is generated.

When the first receiving mode is performed in step 604, a plurality of fundamental mixers 32a and 32b are activated to respectively generate a first differential baseband signal I+/I− or Q+/Q− according to the multiphase LO signal from the local oscillator having two opposite phases and the differential amplified RF signal in step 605. A3

When the second receiving mode is performed in step 606, a plurality of sub-harmonic mixers 34a and 34b are activated to respectively generate a second differential baseband signal I+/I− or Q+/Q− according to the multiphase LO signal from the local oscillator having four orthogonal phases and the differential amplified RF signal in step 607.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dual mode RF transceiver comprising:
   an antenna;
   a differential low noise amplifier (LNA) comprising
      a differential amplifier comprising an input to receive an RF signal from the antenna, wherein a frequency of the RF signal is within a first frequency band range in a first receiving mode, and is within a second frequency band range in a second receiving mode, where the frequency in the second frequency band range is twice of the frequency in the first frequency band range; and
      a differential inductor circuit coupled to a differential output of the differential amplifier and generating a differential amplified RF signal according to a first inductance in the first receiving mode and according to a second inductance in the second receiving mode, wherein the differential inductor circuit comprises four inductors, the four inductors are all in operation to provide the first inductance, and only two of the four inductors are in operation to provide the second inductance, the first inductance is larger than the second inductance;
   a local oscillator to generate a multiphase local oscillating (LO) signal having an oscillating frequency within the first frequency band range; and
   a dual mode differential mixer comprising
      a switch module;
      a plurality of fundamental mixers activated in the first receiving mode to generate a first differential baseband signal according to the multiphase LO signal from the local oscillator and the differential amplified RF signal; and a plurality of sub-harmonic mixers activated in the second receiving mode to generate a second differential baseband signal according to the multiphase LO signal from the local oscillator and the differential amplified RF signal.

2. The dual mode RF transceiver of claim 1, wherein differential output comprises a first output and a second output, and the differential amplifier further comprises:
a first amplifying branch comprising the input and the first output; and
a second amplifying branch comprising a coupling input coupled to a coupled voltage and the second output.

3. The dual mode RF transceiver of claim 2, wherein the first and the second amplifying branches further respectively comprise:
an input MOS having a gate to receive the RF signal or the coupled voltage;
an output MOS having a drain and a source, wherein the source of the output MOS is coupled to a drain of the input MOS and the drain of the output MOS is to generate the differential amplified RF signal; and
an input matching module connected between the gate and the drain of the input MOS to provide an input matching mechanism.

4. The dual mode RF transceiver of claim 3, wherein the input MOS of the first and the second amplifying branches further comprises a source connected to the coupled voltage through an inductor having an inductance larger than a specific value.

5. The dual mode RF transceiver of claim 2, wherein the coupled voltage is a ground potential.

6. The dual mode RF transceiver of claim 1, wherein the differential inductor circuit is a center-tapped symmetrical inductor circuit.

7. The dual mode RF transceiver of claim 1, wherein the plurality of fundamental mixers and the plurality of sub-harmonic mixers are Gilbert mixers respectively.

8. The dual mode RF transceiver of claim 7, wherein the Gilbert mixer in the plurality of fundamental mixers comprises a plurality of mixing units, which are MOS.

9. The dual mode RF transceiver of claim 7, wherein the Gilbert mixer in the plurality of sub-harmonic mixers comprises a plurality of mixing units, which comprise two MOS connected in parallel.

10. The dual mode RF transceiver of claim 7, wherein each of the plurality of fundamental mixers further comprises a dummy mixer such that the part of the multiphase LO signal not used by the Gilbert mixer to generate the first and the second differential baseband signals is canceled out by the dummy mixer.

11. The dual mode RF transceiver of claim 1, wherein the first and the second differential baseband signals are an in-phase differential baseband signal or a quadrature-phase differential baseband signal.

12. The dual mode RF transceiver of claim 1, wherein the multiphase LO signal is an eight-phase LO signal comprising the phases of 0 degree, 45 degrees, 90 degrees, 135 degrees, 180 degrees, 225 degrees, 270 degrees, and 315 degrees.

13. The dual mode RE transceiver of claim 12, wherein one the plurality of the fundamental mixers receives the multiphase LO signal having the phase of 0 degree and 180 degrees, and the other one of the plurality of the fundamental mixers receives the multiphase LO signal having the phase of 90 degrees and 270 degrees to generate the first differential baseband signal according to the differential amplified RF signal during the first receiving mode.

14. The dual mode RF transceiver of claim 12, wherein one the plurality of the sub-harmonic mixers receives the multiphase LO signal having the phase of 0 degree, 90 degrees, 180 degrees and 270 degrees, and the other one of the plurality of the sub-harmonic mixers receives the multiphase LO signal having the phase of 45 degrees, 135 degrees, 225 degrees and 315 degrees to generate the second differential baseband signal according to the differential amplified RF signal during the second receiving mode.

15. The dual mode RF transceiver of claim 1, wherein the multiphase LO signal is generated from a division of an oscillator source having a source frequency that is four times of the oscillating frequency of the multiphase LO signal.

16. An RF signal receiving method adapted in a dual mode RF transceiver, wherein the RF signal receiving method comprises the steps of:
receiving an RF signal from an antenna, wherein the RF signal is within a first frequency band range in a first receiving mode, and is within a second frequency band range in a second receiving mode, where the frequency in the second frequency band range is twice of the frequency in the first frequency band range;
generating a differential amplified RF signal according to a differential inductor circuit coupled to a differential amplifier, wherein the differential inductor circuit has a first inductance in the first receiving mode and has a second inductance in the second receiving mode, wherein the differential inductor circuit comprises four inductors, the four inductors are all in operation to provide the first inductance, and only two of the four inductors are in operation to provide the second inductance, the first inductance is larger than the second inductance;
generating a multiphase LO signal having an oscillating frequency within the first frequency band range; and
activating a plurality of fundamental mixers in the first receiving mode to respectively generate a first differential baseband signal according to the multiphase LO signal from a local oscillator having two opposite phases and the differential amplified RF signal, and activating a plurality of sub-harmonic mixers in the second receiving mode to respectively generate a second differential baseband signal according to the multiphase LO signal from a local oscillator having four orthogonal phases and the differential amplified RF signal.

17. The RF signal receiving method of claim 16, wherein the step of activating a plurality of fundamental mixers in the first receiving mode further comprises cancelling out the part of the multiphase LO signal not used to generate the first differential baseband signal by a dummy mixer.

18. The RF signal receiving method of claim 16, wherein the first differential baseband signal and the second differential baseband signal are an in-phase differential baseband signal or a quadrature-phase differential baseband signal.

19. The RF signal receiving method of claim 16, wherein the step of generating the multiphase LO signal further comprises dividing an oscillator source having a source frequency that is four times of the oscillating frequency of the multiphase LO signal.

* * * * *